(12) United States Patent
Sakaki

(10) Patent No.: US 6,271,675 B1
(45) Date of Patent: *Aug. 7, 2001

(54) TERMINAL CONTACT-TYPE IC CARD HAVING TERMINAL CONTACT FAULT DETECTOR, IC CARD SYSTEM USING THE IC CARD, AND IC FOR THE IC CARD

(75) Inventor: Kinya Sakaki, Tokyo (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/872,989

(22) Filed: Jun. 11, 1997

(30) Foreign Application Priority Data

Jun. 21, 1996 (JP) .................................... 8-161985

(51) Int. Cl.[7] ............................ G01R 31/02; G06F 12/00
(52) U.S. Cl. ......................... 324/756; 324/538; 324/133; 235/438
(58) Field of Search ................................ 324/537, 538, 324/756, 765, 133; 439/489, 912; 235/437, 438

(56) References Cited

U.S. PATENT DOCUMENTS

| | | | |
|---|---|---|---|
| 4,827,111 | 5/1989 | Kondo . | |
| 4,990,760 | * 2/1991 | Tomari et al. | 235/492 |
| 5,034,599 | * 7/1991 | Hirata | 235/438 |
| 5,126,541 | * 6/1992 | Shinagawa | 235/438 |
| 5,521,586 | * 5/1996 | Takeshita | 324/133 X |
| 5,761,144 | * 6/1998 | Fukuzumi | 365/226 |
| 6,062,480 | * 5/2000 | Evoy | 235/492 |

FOREIGN PATENT DOCUMENTS

| | | |
|---|---|---|
| 0 265 312 | 4/1988 | (EP) . |
| 0 341 712 | 11/1989 | (EP) . |
| 0 363 871 | 4/1990 | (EP) . |
| 0 633 544 A2 | 1/1995 | (EP) . |
| 0 633 544 A3 | 1/1995 | (EP) . |
| 60-065621 | 4/1985 | (JP) . |
| 60-65621 | 4/1985 | (JP) . |

* cited by examiner

*Primary Examiner*—Glenn W. Brown
(74) *Attorney, Agent, or Firm*—Oblon, Spivak, McClelland, Maier & Neustadt, P.C.

(57) ABSTRACT

An IC card system has, at least, an IC card having a first set of terminals and an external unit having a second set of terminals. The IC card has a detector for detecting a contact condition between the first and second sets of terminals, a controller, and an internal circuit such as an EEPROM. If the detector determines that the contact condition is faulty, the controller completes a given process, and then, stops the operation of the internal circuit. If an access operation to the internal circuit is in progress when the detector finds contact fault, the controller does not stop immediately and continues to complete the access operation, to prevent the writing or reading of erroneous data. The present invention also provides an IC card for the IC card system and a semiconductor IC incorporated in the IC card.

31 Claims, 11 Drawing Sheets

TERMINAL CONTACT-TYPE IC CARD HAVING TERMINAL CONTACT FAULT DETECTOR, IC CARD SYSTEM USING THE IC CARD, AND IC FOR THE IC CARD

BACKGROUND OF THE INVENTION

1. Field of the Invention

The present invention relates to a contact-type IC card that functions when its terminals are in contact with the terminals of an external unit. The present invention also relates to an IC card system employing an IC card and to an integrated circuit (IC) used for IC cards. In particular, the present invention relates to a contact-type IC card capable of detecting contact fault on terminals and coping with the contact fault, and to an IC card system employing such an IC card.

2. Description of the Prior Art

IC cards generally have a plastic package and incorporate IC chips such as a microcomputer chip and a memory chip. Among the IC cards, a contact-type IC card has metal terminals that are brought in mutual contact with the terminals of a reader-writer, to communicate data between them. FIG. 1 shows a conventional IC card system employing a contact-type IC card. The IC card 100 is attached to and ejected from a reader-writer 30, which is connected to a host computer (not shown). The reader-writer 30 mediates between the IC card 100 and the host computer.

The IC card 100 has metal terminals 11 to 15, which are brought in contact with terminals 31 to 35 of the reader-writer 30. The IC card 100 incorporates a single semiconductor IC chip containing a CPU 106 and an EEPROM 17. The CPU 106 controls an interface with the reader-writer 30 through the terminals 11 to 15 and an access to the EEPROM 17. The reader-writer 30 has a control circuit 40 that controls the reception and ejection of the IC card 100 and data communication with the IC card 100 and with the host computer. Among the terminals 31 to 35 of the reader-writer 30, the terminal 31 applies a supply voltage VDD to the IC card 100, the terminal 32 is for grounding, the terminal 33 sends a clock signal CLK to the IC card 100, the terminal 34 is an I/0 terminal for data communication with the IC card 100, and the terminal 35 sends a reset signal RST to the IC card 100.

The contact-type IC cards are simpler in structure than non-contact-type IC cards. The contact-type IC cards, however, may cause contact failure at terminals due to, for example, dirt when repeatedly attached to and removed from a reader-writer. If contact at terminals is poor or faulty, the reader-writer is unable to control the IC card and will erroneously write or read data to or from the IC card, thereby degrading the reliability of the IC card. To solve this problem, the contact-type IC cards must have functions of detecting contact fault on terminals and coping with the same.

FIG. 2 shows a semiconductor IC for detecting an open state between terminals. This is disclosed in Japanese Unexamined Patent Publication No. 60-65621 (JP6065621).

The IC 210 has a set 220 of input terminals, a set 230 of output terminals, a sequential circuit 240, and a gate circuit 250 for detecting an open state of the input terminal 221. The sequential circuit 240 usually operates with the input terminals 221 and 222. If the input terminal 221 is open, the gate circuit 250 detects the same and forcibly sets the sequential circuit 240 to a given state to provide a given value.

As soon as the gate circuit 250 detects an open state of the terminal 221, the sequential circuit 240 is set to the given state. When applied to a contact-type IC card, the semiconductor IC disclosed in JP60-65621 quickly stops a CPU in the IC card upon detecting contact fault on, for example, a reset terminal. Then, the IC card is unable to inform a reader-writer of the fault, and the reader-writer is unable to properly and quickly cope with the fault. If such fault occurs at a clock terminal while data is being written into an EEPROM of the IC card, the data will not completely be written, or erroneous data will be stored in the EEPROM. If such fault occurs at the clock terminal while data is being read out of the EEPROM, the data will not completely be read, or erroneous data will be read. In this way, the semiconductor IC disclosed in above JP60-65621 cannot cope with the contact fault and is incapable of improving the reliability of IC cards.

SUMMARY OF THE INVENTION

An object of the present invention is to provide a semiconductor IC for a contact-type IC card, capable of quickly coping with contact fault occurring on a terminal of the IC card.

Another object of the present invention is to provide a semiconductor IC incorporated in an IC card, having a simple structure to test a contact condition between the terminals of the IC card and the terminals of an external unit.

Still another object of the present invention is to provide an IC card having a simple structure to surely detect contact fault between a reset terminal of the IC card and a corresponding terminal of an external unit and quickly and properly cope with the contact fault.

Still another object of the present invention is to provide an IC card having a simple structure to surely detect a poor contact between a clock terminal of the IC card and a corresponding terminal of an external unit and quickly and properly cope with the poor contact.

Still another object of the present invention is to provide an IC card capable of correctly writing data even if contact fault occurs during a write operation.

Still another object of the present invention is to provide an IC card capable of easily identifying erroneous data written on contact fault.

Still another object of the present invention is to provide an IC card capable of correctly reading data even if contact fault occurs during a read operation.

Still another object of the present invention is to provide an IC card system having a simple structure to surely detect a poor contact between a reset terminal of an IC card and a corresponding terminal of an external unit such as a reader-writer, and capable of properly and quickly coping with the poor contact.

Still another object of the present invention is to provide an IC card system having a simple structure to surely detect contact fault between a clock terminal of an IC card and a corresponding terminal of an external unit such as a reader-writer, and capable of properly and quickly coping with the contact fault.

Still another object of the present invention is to provide an IC card system capable of correctly writing data even if contact fault occurs during a write operation.

Still another object of the present invention is to provide an IC card system capable of easily identifying erroneous data written on contact fault.

Still another object of the present invention is to provide an IC card system capable of correctly reading data even if contact fault occurs during a read operation.

In order to accomplish the objects, a first aspect of the present invention provides a semiconductor IC for an IC card. The IC card has a first set of terminals to be connected to a second set of terminals of an external unit. The semiconductor IC embedded in the IC card has an internal circuit, detecting means such as a detector, and control means such as a controller. The internal circuit receives electric signals from the first set of terminals. The detecting means detects a poor contact, or a contact fault between the first and second sets of terminals. The controlling means controls the internal circuit according to the output of the detector. The detecting means is connected to a reset terminal among the first set of terminals through a line. A terminal among the second set of terminals corresponding to the reset terminal is connected to a pull-up resistor. Namely, the pull-up resistor is connected between a high-level power supply and the terminal corresponding to the reset terminal. The detecting means includes first and second transistors. The first transistor is arranged between and connected to the high-level power supply and the reset terminal. The second transistor is arranged between and connected to the reset terminal and a low-level power supply such as ground (GND). The second transistor has internal resistance (ON resistance) that is higher than the resistance of the pull-up resistor. The semiconductor IC further has a signal generator for generating signals applied to the control electrodes of the first and second transistors, so that a contact condition between the reset terminal and the corresponding terminal is tested from a voltage at the reset terminal. If the reset terminal is properly in contact with the corresponding terminal, the potential at the reset terminal will correspond to a value determined by dividing the high-level supply voltage by the ratio of the resistance of the pull-up resistor to the ON resistance of the second transistor. If the reset terminal is improperly in contact with the corresponding terminal, the reset terminal has a voltage close to the voltage of the low-level power supply (GND). Accordingly, detecting the voltage of the reset terminal tells whether or not the reset terminal is properly in contact with the corresponding terminal. This arrangement is simple to surely detect contact fault.

The detecting means, or the detector may be connected to a clock terminal among the first set of terminals through a line. In this case, the detecting means consists of a first input circuit, an inverter circuit, a selector, a second input circuit connected to the inverter circuit, and a confirmation gate circuit connected to the first and second input circuits. The first input circuit, inverter circuit, and selector are connected to the clock terminal. The confirmation gate circuit provides a start signal to drive a self-oscillator, which generates an internal clock signal supplied to the selector. The first input circuit generates a high-potential or high-impedance signal based on the potential of the clock terminal. The output of the first input circuit is passed through a first low-pass filter. The inverter circuit inverts the potential of the clock terminal. Based on the output of the inverter, the second input circuit generates a high-potential or high-impedance signal. The output of the second input circuit is passed through a second low-pass filter. The confirmation gate circuit refers to the outputs of the first and second input circuits and determines whether or not the clock terminal is properly receiving an external clock signal. If not, the confirmation gate circuit provides the self-oscillator with the start signal to generate the internal clock signal. The selector selects the internal clock signal when the start signal is active, or the external clock signal when the start signal is inactive. The selected clock signal is supplied as a system clock signal to the internal circuit. The outputs of the first and second input circuits are used to test a contact condition between the first and second sets of terminals. The internal circuit may be a memory. If a poor contact or a contact fault occurs on the clock terminal while data is being written into the memory, the internal clock signal from the self-oscillator is used to complete the write operation. As a result, data is always correctly written into the memory. If contact fault occurs on the clock terminal while data is being read out of the memory, the operation of the internal circuit does not stop immediately and the internal clock signal from the self-oscillator is used to continue and complete the read operation. As a result, data is always correctly read out of the memory.

A second aspect of the present invention provides a contact-type IC card having a first set of terminals to be connected to a second set of terminals of an external unit such as a reader-writer. The IC card has a peripheral circuit, a CPU, and detecting means. The peripheral circuit has a memory for storing data. The CPU controls the operation of the peripheral circuit. The detecting means such as a detector detects a contact condition between the first and second sets of terminals. The CPU has testing means, notifying means, and reset prohibiting means. The testing means such as tester tests whether or not the contact condition detected by the detecting means is good. The notifying means, or the notifier notifies to the external unit of contact fault if it is found by the testing means. The reset prohibiting means such as a reset prohibition unit prohibits the resetting of the CPU while the testing means and notifying means are operating.

The detecting means is connected to a reset terminal among the first set of terminals. A terminal among the second set of terminals corresponding to the reset terminal is connected to a pull-up resistor. The pull-up resistor is arranged between and connected to a high-level power supply and the terminal corresponding to the reset terminal. The detecting means has first and second transistors. The first transistor is arranged between and connected to the high-level power supply and the reset terminal. The second transistor is arranged between and connected to the reset terminal and a low-level power supply (GND). The internal resistance (ON resistance) of the second transistor is greater than the resistance of the pull-up resistor.

The first and second transistors are turned on and off at predetermined timing. The potential at the reset terminal while the first and second transistors being ON is used to test a contact condition between the first and second sets of terminals. The CPU is reset when the level of a reset signal is low. If the potential at the reset terminal is equal to a voltage obtained by dividing the high-level supply voltage by the ratio of resistance of the pull-up resistor to the ON resistance of the second transistor, the reset terminal is properly in contact with the corresponding terminal. If not so, there is a contact fault or a poor contact on the reset terminal. Then, the CPU is protected from a reset operation and the contact fault is quickly notified to the external unit, which properly and speedily copes with the contact fault.

The CPU may consist of a tester (testing means), a notifier (notifying means), and a controller (control means). The tester tests whether or not the contact condition detected by the detecting means, or the detector is good and sound. The notifier notifies to the external unit of contact fault if it is found by the tester. If contact fault is found while memory in the peripheral circuit is being accessed, the controller does not immediately stop the operation of CPU, but continues and completes the access operation and then stops the CPU. It is preferable that the notifier notifies the external unit of the contact fault before the controller stops the CPU.

To achieve this, the detector consists of a first input circuit, an inverter circuit, a selector, a second input circuit, and a confirmation gate circuit. The first input circuit is connected to a clock terminal among the first set of terminals. The inverter circuit and selector are also connected to the clock terminal. The second input circuit is connected to the inverter circuit. The confirmation gate circuit is connected to the first and second input circuits. The confirmation gate circuit provides a start signal to drive a self-oscillator, which generates an internal clock signal supplied to the selector. If contact fault occurs to stop an external clock signal passing through the clock terminal, the internal clock signal from the self-oscillator is used to continue and to complete the access operation.

The access operation may be writing data into the memory, reading data out of the memory, or writing an abnormality identifier into a predetermined area in the memory.

The IC card of the second aspect has a simple structure to surely detect a poor contact or a contact fault on the clock terminal. Even if the poor contact or the contact fault on the clock terminal occurs while data is being written into the memory, the second aspect continues and completely writes the data into the memory. Even if the contact fault on the clock terminal occurs while data is being read out of the memory, the second aspect does not stop immediately the read operation but continues to completely read the data. If the contact fault on the clock terminal occurs when data is written into a given area of the memory, the second aspect may write an abnormality identifier into the area. When this area of the memory is read later, it is easily understood that the data in the area is erroneous. After the abnormality identifier is written into the area, the notifying means notifies the external unit of the contact fault, and then, the control means stops the operation of the CPU. Upon receiving the notification of the contact fault, the external unit quickly takes proper steps to cope with it.

A third aspect of the present invention provides an IC card system including a contact-type IC card and an external unit. The IC card may be of the second aspect.

The IC card has a first set of terminals to be connected to a second set of terminals of the external unit. The external unit may be a reader-writer connected to a host computer. Namely, the external unit mediates between the IC card and the host computer.

The IC card has a peripheral circuit, a CPU, and detecting means. The peripheral circuit has a memory for storing data. The CPU controls the operation of the peripheral circuit. The detecting means detects a contact condition between the first and second sets of terminals. The CPU has testing means, notifying means, and reset prohibition means. The testing means, or the tester tests whether or not the contact condition detected by the detector is good and sound. The notifying means, or the notifier notifies the external unit of contact fault if it is found by the tester. The reset prohibition means, or the reset prohibition unit prohibits the resetting of the CPU while the tester and notifier are operating. The CPU may consist of a tester, a notifier, and control means. The tester tests whether or not the contact condition detected by the detector is excellent. The notifier notifies to the external unit of contact fault if it is found by the tester. If contact fault is found white the memory in the peripheral circuit is being accessed, the control means, or the controller continues to complete the access operation and then stops the CPU. This access operation may be writing data into the memory, reading data out of the memory, or writing an abnormality identifier into a predetermined area in the memory.

The IC card system of the third aspect has a simple structure to surely detect contact fault on the reset terminal. If such contact fault is detected, it is notified to the external unit, which quickly takes proper steps to cope with the contact fault, thereby improving the reliability of the system. Also, the IC card system of the third aspect is simple to surely detect contact fault on the clock terminal. If such contact fault is detected, the third aspect, if necessary, continues and completes a presently progressing operation and then stops the CPU, thereby preventing a write or read error. The third aspect notifies to the external unit of the contact fault, so that the external unit quickly takes proper steps to cope with the contact fault. If the contact fault on the clock terminal is detected when data is being written into a given area in the memory of the IC card, the third aspect may write an abnormality identifier into the area. When the area is read later, it is easily understood that the data in the area is erroneous. This results in improving the reliability of the system.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

DETAILED DESCRIPTION OF THE EMBODIMENTS

Figure 1:
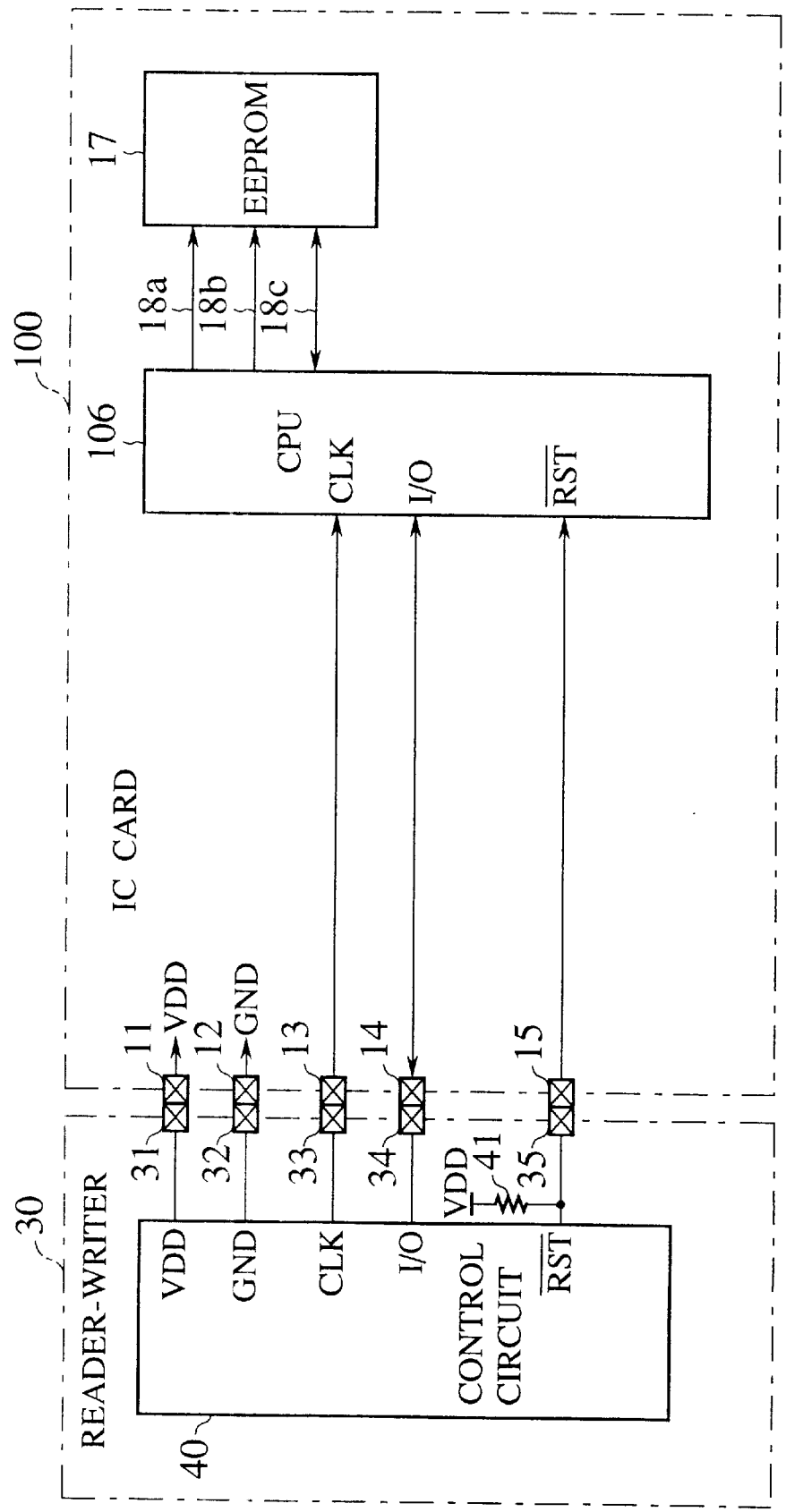
FIG. 1 is a block diagram showing a contact-type IC card system according to a prior art.
Figure 2:
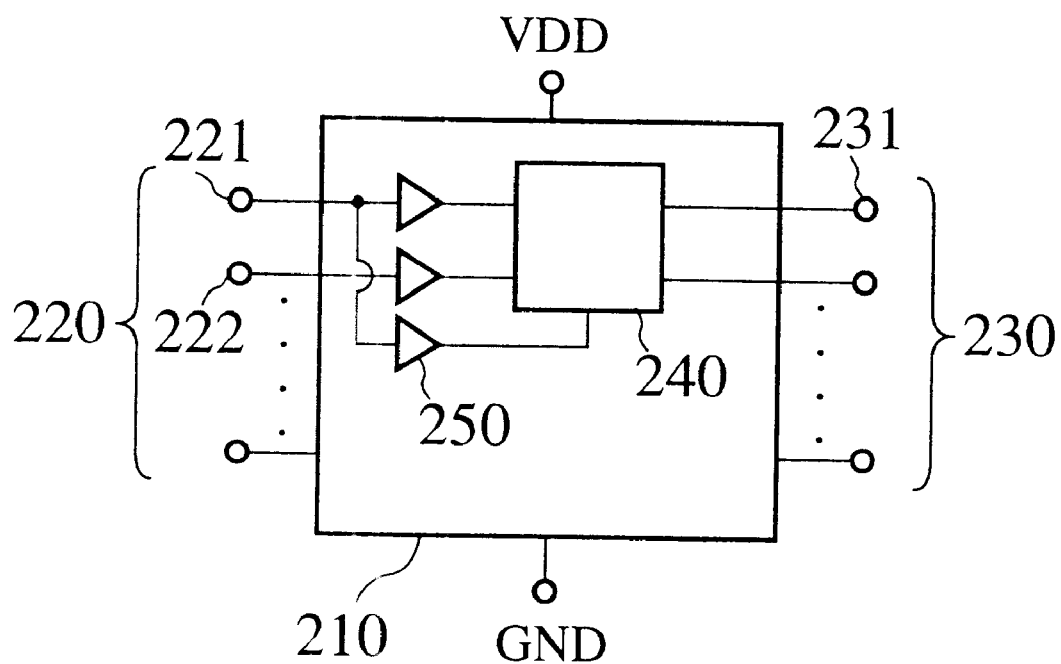
FIG. 2 is a block diagram showing a semiconductor IC having a circuit for detecting an open state of a terminal according to a prior art.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

(First embodiment)

Figure 3:
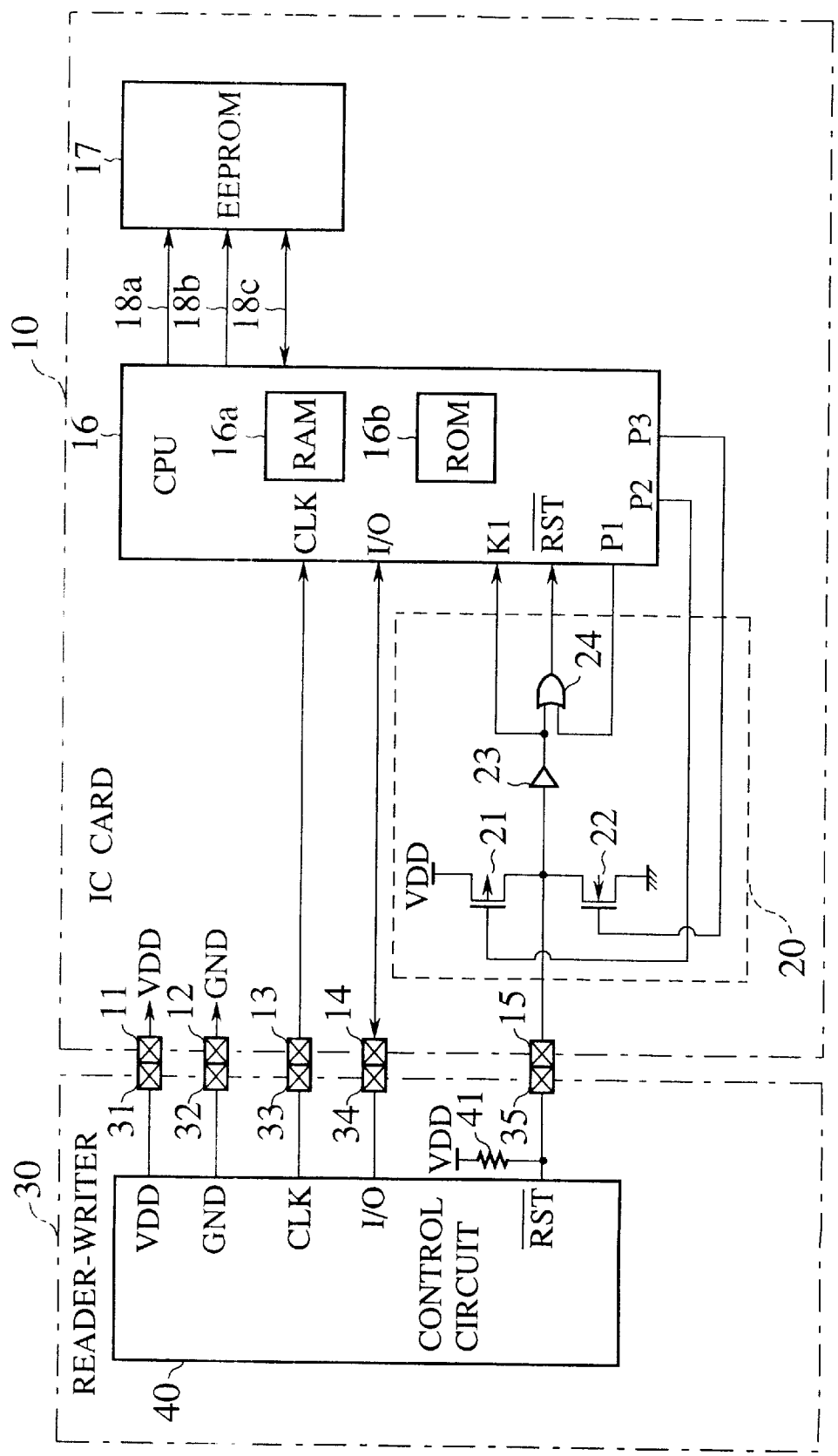
FIG. 3 is a block diagram showing a contact-type IC card system according to a first embodiment of the present invention.

FIG. 3 is a block diagram showing a contact-type IC card system according to the first embodiment of the present invention. The system includes a contact-type IC card 10 and a reader-writer 30. The reader-writer 30 mediates between the IC card 10 and a host computer (not shown). The IC card 10 has a first set of terminals exposed outside. The first set of terminals include a terminal 11 for receiving a supply voltage VDD, a terminal 12 for grounding, a clock terminal 13 for receiving a clock signal CLK, an I/O terminal 14 for communicating data, and a reset terminal 15 for receiving a reset signal RST. The IC card 10 incorporates a single semiconductor chip monolithically integrating a CPU 16, an EEPROM 17, an address bus 18a, a control bus 18b, and a data bus 18c. These buses connect the CPU 16 and EEPROM 17 to each other. The CPU 16 has a RAM 16a serving as a work area and a ROM 16b for storing programs. The CPU 16 controls an interface with the reader-writer 30 through the terminals 11 to 15 and an access to the EEPROM 17. The CPU 16 has a function of testing a terminal contact condition and a function of notifying to the reader-writer 30 of an abnormality, i.e., contact fault. These functions are characteristic to the present invention.

The IC card 10 has a detector 20 for detecting the contact condition of the reset terminal 15. The detector 20 cooperates with the testing function of the CPU 16 and determines whether or not the contact condition of the reset terminal 15 is sound.

The reader-writer 30 has a second set of terminals 31 to 35. The reader-writer 30 has a motor and a belt to automatically receive and eject the IC card 10. When the IC card 10 is inserted into the reader-writer 30, the terminals 31 to 35 come in contact with the terminals 11 to 15. The reader-writer 30 provides the IC card 10 with the supply voltage VDD, clock signal CLK, and reset signal RST. The reader-writer 30 has a control circuit 40 that communicates data with the IC card 10 and with the host computer and controls the reception and ejection of the IC card 10.

The reset signal RST is active when it is low, and therefore, the reset terminal 35 of the reader-writer 30 is connected to a pull-up resistor 41. The pull-up resistor 41 is connected between a high-level power supply VDD and the reset terminal 35 to fix the terminal 35 at the high level to inactivate the reset signal RST.

The detector 20 characteristic to the present invention consists of a p-channel MOS transistor (hereinafter referred to as "the p-MOS") 21 and an n-channel MOS transistor (hereinafter referred to as "the n-MOS") 22. The p- and n-MOSs 21 and 22 are connected in series between the supply voltage VDD and a ground voltage GND. A node between the p- and n-MOSs 21 and 22 is connected to the reset terminal 15. The gate length and channel impurity concentration of the n-MOS 22 are set so that the ON resistance thereof is sufficiently greater than the resistance of the pull-up resistor 41.

The detector 20 also has a buffer 23 connected to the reset terminal 15. The output of the buffer 23 is connected to a terminal K1 of the CPU 16 and to an OR gate 24. The OR gate 24 also receives a signal from a terminal P1 of the CPU 16. When the reset terminal 15 is inactive, the output of the OR gate 24 is high, so that the CPU 16 may not be reset. When testing the contact condition of the reset terminal 15, the testing function of the CPU 16 sequentially sends signals from terminals P2 and P3 to turn on the p- and n-MOSs 21 and 22 at predetermined timing. Then, the CPU 16 checks the potential of the reset terminal 15 and determines whether or not the contact condition of the reset terminal 15 is good and sound.

Figure 4:
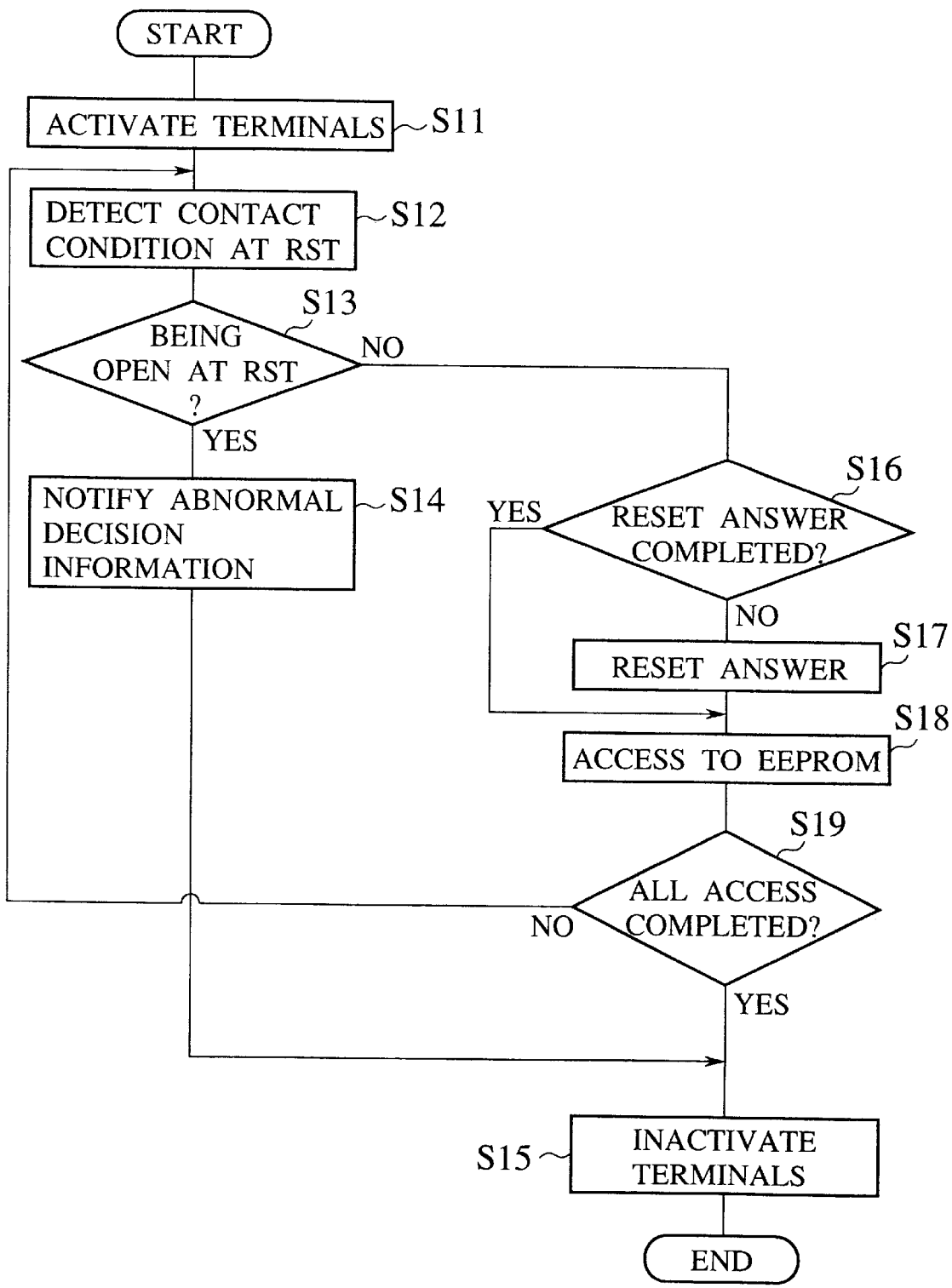
FIG. 4 is a flowchart showing the operation of an IC card of the system of the first embodiment.
Figure 5:
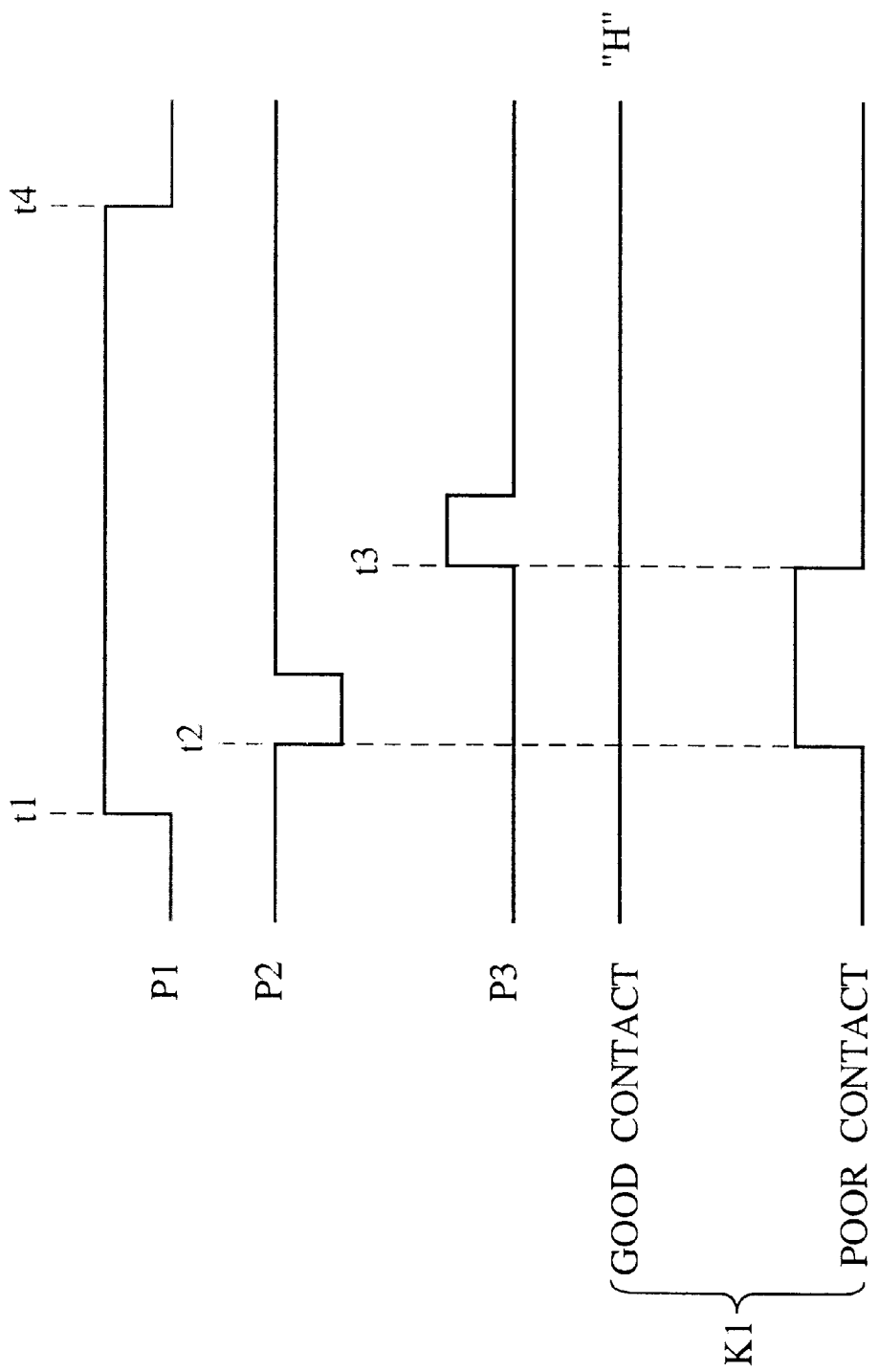
FIG. 5 is a timing chart showing an operation of detecting the contact condition of a reset terminal of the system of the first embodiment.

The operation of the first embodiment will be explained with reference to FIGS. 4 and 5 in which FIG. 4 is a flowchart showing the operation of the IC card 10 and FIG. 5 is a timing chart showing an operation of detecting the contact condition of the reset terminal 15. In step S11, the IC card 10 is inserted into the reader-writer 30, which activates the terminals 11 to 15 of the IC card 10 through the terminals 31 to 35. Namely, the reader-writer 30 sets the reset terminal 35 to low, applies the supply voltage VDD through the terminal 31, sets the I/O terminal 34 to high, and provides the clock signal CLK through the clock terminal 33. Thereafter, the reader-writer 30 returns the reset terminal 35 to high. If the terminals 11 to 15 of the IC card 10 are surely in contact with the terminals 31 to 35 of the reader-writer 30, the terminals 11 to 15 are activated accordingly.

Step S12 detects the contact condition of the reset terminal 15, and step S13 determines whether or not the contact condition is excellent. These steps will be explained in detail. At t1 (FIG. 5), the terminal P1 of the CPU 16 is high. At t2, the terminal P2 of the CPU 16 falls to turn on the p-MOS 21. This makes the reset terminal 15 high without regard to the contact condition thereof. As a result, the terminal K1 of the CPU 16 is high.

The terminal P2 is returned to high. At t3, the terminal P3 rises to turn on the n-MOS 22. If the contact condition of the reset terminal 15 is good, the potential of the reset terminal 15 will correspond to a value obtained by dividing the supply voltage VDD by a ratio of the resistance of the pull-up resistor 41 to the resistance of the n-MOS 22. Then, the supply voltage VDD is applied to the reset terminal 15 through the pull-up resistor 41 whose resistance is sufficiently smaller than the ON resistance of the n-MOS 22. Accordingly, the terminal K1 of the CPU 16 is high. If the contact condition of the reset terminal 15 is poor or faulty, the reset terminal 15 is low when the n-MOS 22 is turned on. Then, the terminal K1 of the CPU 16 is low. In this way, if the contact condition of the reset terminal 15 is good, the terminal K1 is high when any one of the p- and n-MOSs 21 and 22 is turned on. If the contact condition of the reset terminal 15 is poor or faulty, the terminal K1 is high when the p-MOS 21 is turned on and low when the n-MOS 22 is turned on. Based on the potential of the terminal K1, the testing function of the CPU 16 surely determines the contact condition of the reset terminal 15.

If the contact condition of the reset terminal 15 is faulty in step S13, the CPU 16 notifies, in step S14, to the reader-writer 30 of the abnormality, i.e., the contact fault. At t4, the potential of the terminal P1 of the CPU 16 falls. The poor contact, or the contact fault of the reset terminal 15 is quickly notified to the reader-writer 30, which quickly takes proper steps to cope with it. During the testing of the reset terminal 15 and the notifying of abnormality information, the terminal P1 is high to protect the CPU 16 from being reset. Thereafter, the reader-writer 30 inactivates the terminals 11 to 15 in step S15. Namely, the reader-writer 30 makes the reset terminal 35 low, the clock terminal 33 low, the I/O terminal 34 low, and the voltage supply terminal 31 zero. This completes the operation of FIG. 4.

If the contact condition of the reset terminal 15 is good in step S13, step S16 checks to see if a reset answer has been made. At the start of the process, step S11 makes the reset terminal 15 low to reset the CPU 16. Thereafter, the potential of the reset terminal 15 is returned to high to end the reset operation. After the reset operation, the CPU 16 provides the reader-writer 30 with the reset answer through the I/O terminal 14 in step S17. The reset answer may include a data exchange protocol type and transmission control parameters.

Upon receiving the reset answer, the reader-writer 30 issues a command to access a specific area in the EEPROM 17. At this time, the reader-writer 30 informs the CPU 16 of the kind of access (write, read, or erase), an objective file, and the address of the specific area in the EEPROM 17. Upon receiving the command, the CPU 16 sends status information to the reader-writer 30. Thereafter, write data, for example, is transmitted from the reader-writer 30 to the IC card 10 through the I/O terminal 14, and the data is written into the specific area in the EEPROM 17. These processes are carried out in step S18.

Step S19 checks to see if the access operation to the EEPROM 17 is complete. If not, step S12 is repeated. This time, step S16 provides YES to skip step S17 because the reset answer has already been made. If the access operation to the EEPROM 17 is complete in step S19, the reader-writer 30 inactivates the terminals in step S15, and the operation of FIG. 4 ends.

(Second embodiment)

Figure 6:
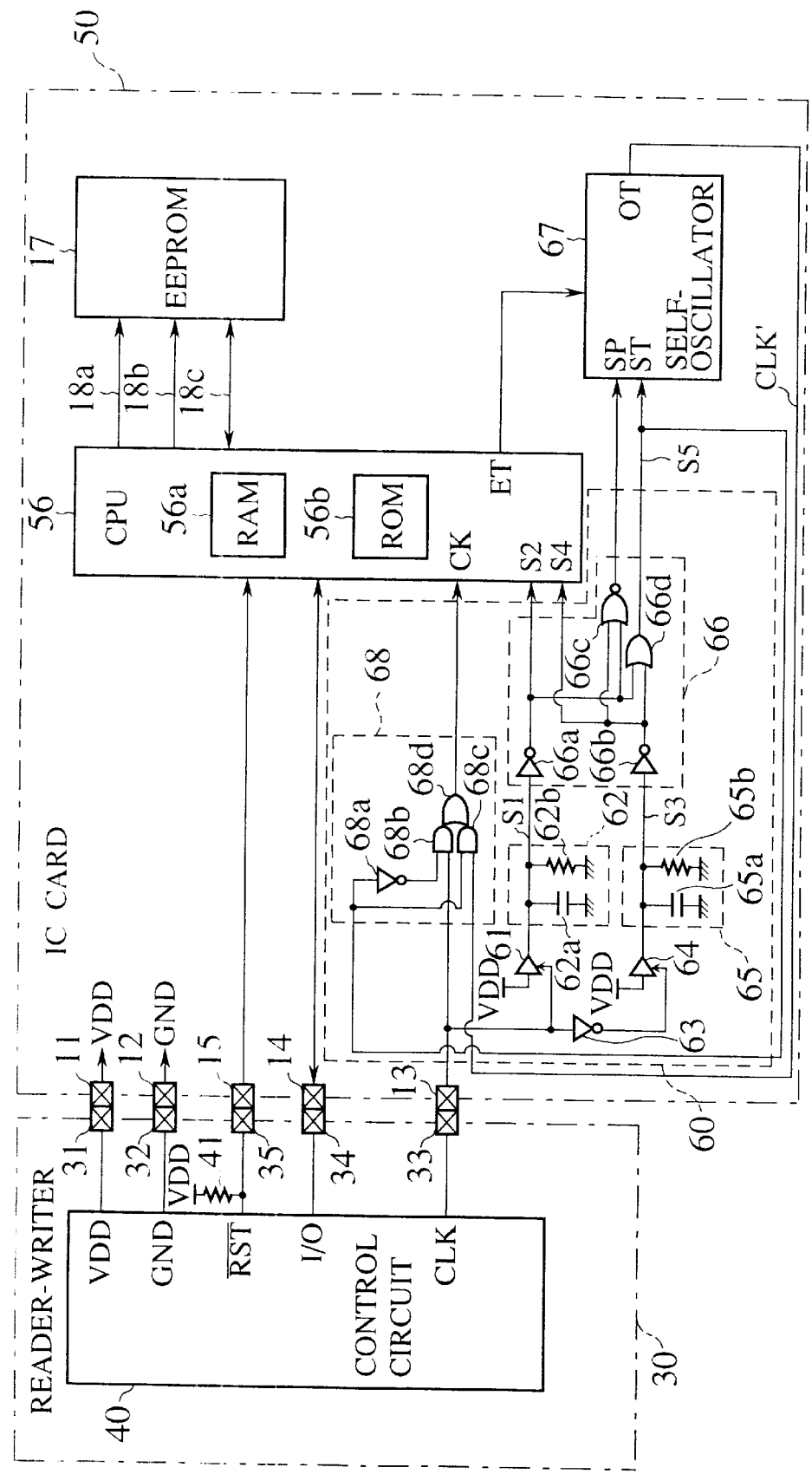
FIG. 6 is a block diagram showing a contact-type IC card system according to a second embodiment of the present invention.

FIG. 6 is a block diagram showing a contact-type IC card system according to the second embodiment of the present invention. The system includes a contact-type IC card 50, a reader-writer 30 serving as an external unit, and a host computer (not shown). The IC card 50 has a first set of terminals including a terminal 11 for receiving a supply voltage VDD, a terminal 12 for grounding, a clock terminal 13 for receiving a clock signal CLK, an I/O terminal 14, and a reset terminal 15 for receiving a reset signal RST. The reader-writer 30 has a second set of terminals 31 to 35. The IC card 50 incorporates a semiconductor IC chip monolithically integrating a CPU 56, a peripheral circuit, a detector 60, and a self-oscillator 67. The CPU 56 includes a RAM 56a and a ROM 56b. The peripheral circuit includes an EEPROM 17. The CPU 56 and EEPROM 17 are connected to each other through buses 18a, 18b, and 18c.

The CPU 56 has a testing function and a controlling function that are characteristic to the second embodiment. The detector 60 detects the contact condition of the clock terminal 13 that receives the external clock signal CLK. The detector 60 and the testing function of the CPU 56 cooperate with each other to determine whether or not the contact condition detected by the detector 60 is good. If the contact condition is determined to be faulty while a given area of the EEPROM 17 is being accessed, the controlling function of the CPU 56 continues, if necessary, the access operation with the use of an internal clock signal CLK', which is explained later. At the same time, the controlling function notifies to the reader-writer 30 of the faulty contact, and then, stops the CPU 56.

The detector 60 consists of a first input circuit (61, 62), a second input circuit (64, 65), a confirmation gate circuit 66, a selector 68, and an inverter 63. The first input circuit consists of a first tri-state buffer 61 and a first low-pass filter (LPF) 62. The second input circuit consists of a second tri-state buffer 64 and a second low-pass filter 65. The tri-state buffer 61 provides an output of VDD or of high impedance depending on the potential of the clock terminal 13. The output of the tri-state buffer 61 is connected to the low-pass filter 62 that is composed of a capacitor 62a and a resistor 62b. The inverter 63 inverts the potential of the clock terminal 13. The inverted potential controls the output of the tri-state buffer 64 to VDD or to high impedance. The output of the tri-state buffer 64 is supplied to the low-pass filter 65, which consists of a capacitor 65a and a resistor 65b. The outputs S1 and S3 of the low-pass filters 62 and 65 are connected to the gate circuit 66. In the gate circuit 66, inverters 66a and 66b invert the outputs S1 and S3. The outputs of the inverters 66a and 66b are supplied to a NOR gate 66c, to an OR gate 66d, and to terminals S2 and S4 of the CPU 56. The terminals S2 and S4 are connected to the testing function of the CPU 56.

The gate circuit 66 checks the outputs of the first and second input circuits to see if the external clock signal CLK from the reader-writer 30 is present. If there is no clock signal, the gate circuit 66 raises a self-oscillation start signal S5 to make the self-oscillator 67 generate the internal clock signal CLK'. The clock terminal 13 is connected to the selector 68 that selects one of the clock signals CLK and CLK'. The selector 68 consists of an inverter 68a, AND gates 68b and 68c, and an OR gate 68d. When the start signal S5 is high, the selector 68 selects the internal clock signal CLK', and when it is low, the external clock signal CLK. The selected one is supplied as a system clock signal to a clock terminal CK of the CPU 56.

The self-oscillator 67 has a known structure. The self-oscillator 67 has a stop terminal SP to receive the output of the NOR gate 66c and a start terminal ST to receive the output of the OR gate 66d, i.e., the start signal S5. When the signal to the stop terminal SP is high and the start signal S5 to the start terminal ST is low, the self-oscillator 67 is inactive. When the stop terminal SP is low and the start terminal ST is high, the self-oscillator 67 is active to generate the internal clock signal CLK' from an output terminal OT. The CPU 56 has a terminal ET to provide a control signal to forcibly stop the self-oscillator 67.

Figure 7:
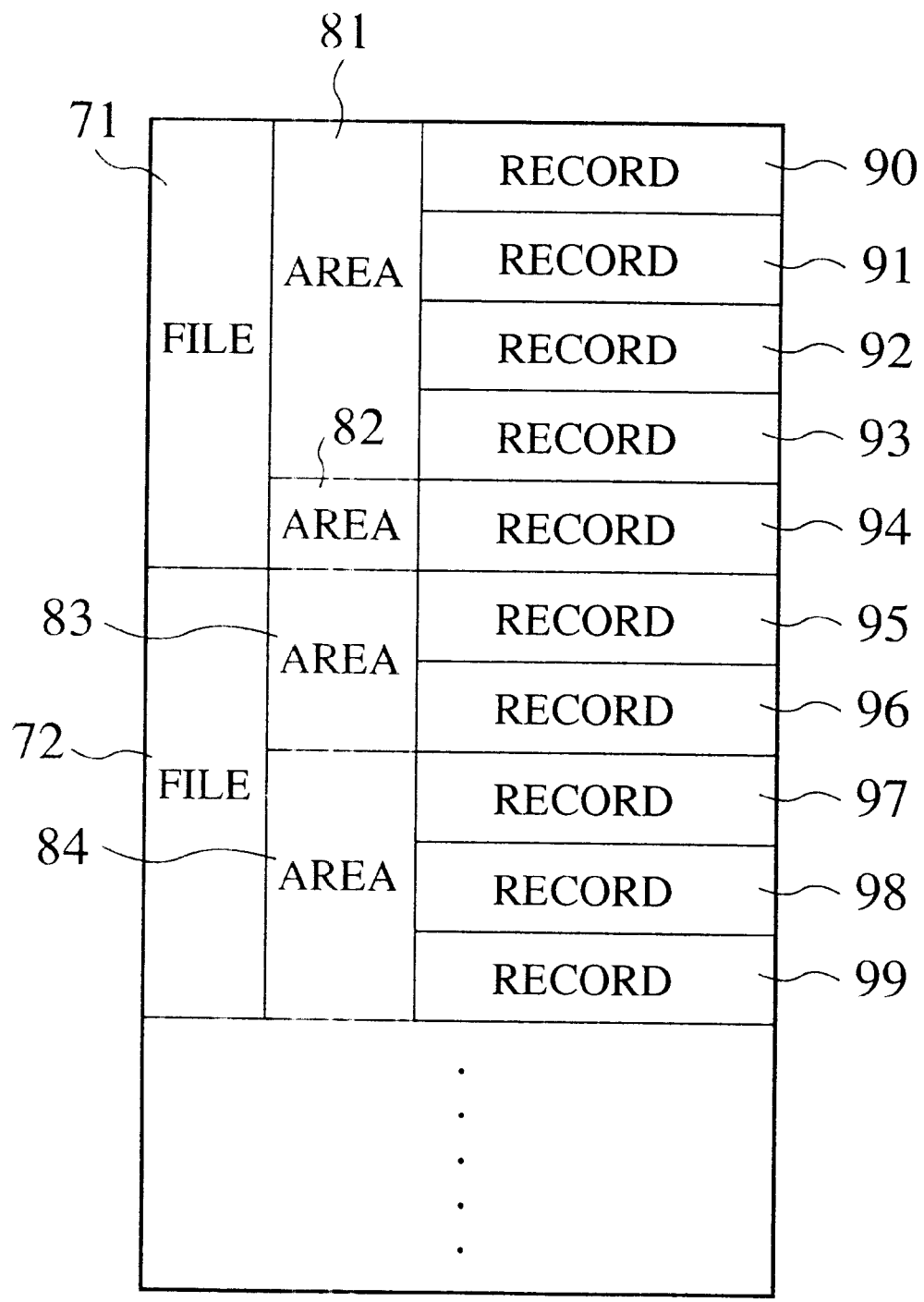
FIG. 7 shows an example of a data storage hierarchy of an EEPROM in the system of the second embodiment.

FIG. 7 shows an example of a data storage hierarchy of the EEPROM 17. The hierarchy consists of files 71, 72, and the like for storing related data. The files consist of areas 81, 82, 83, 84 and the like. Each area has a name for storing related data. Each area consists of records 90, 91, 92, ..., 99 and the like. In each area, the records store the data of the area in order.

Figure 8:
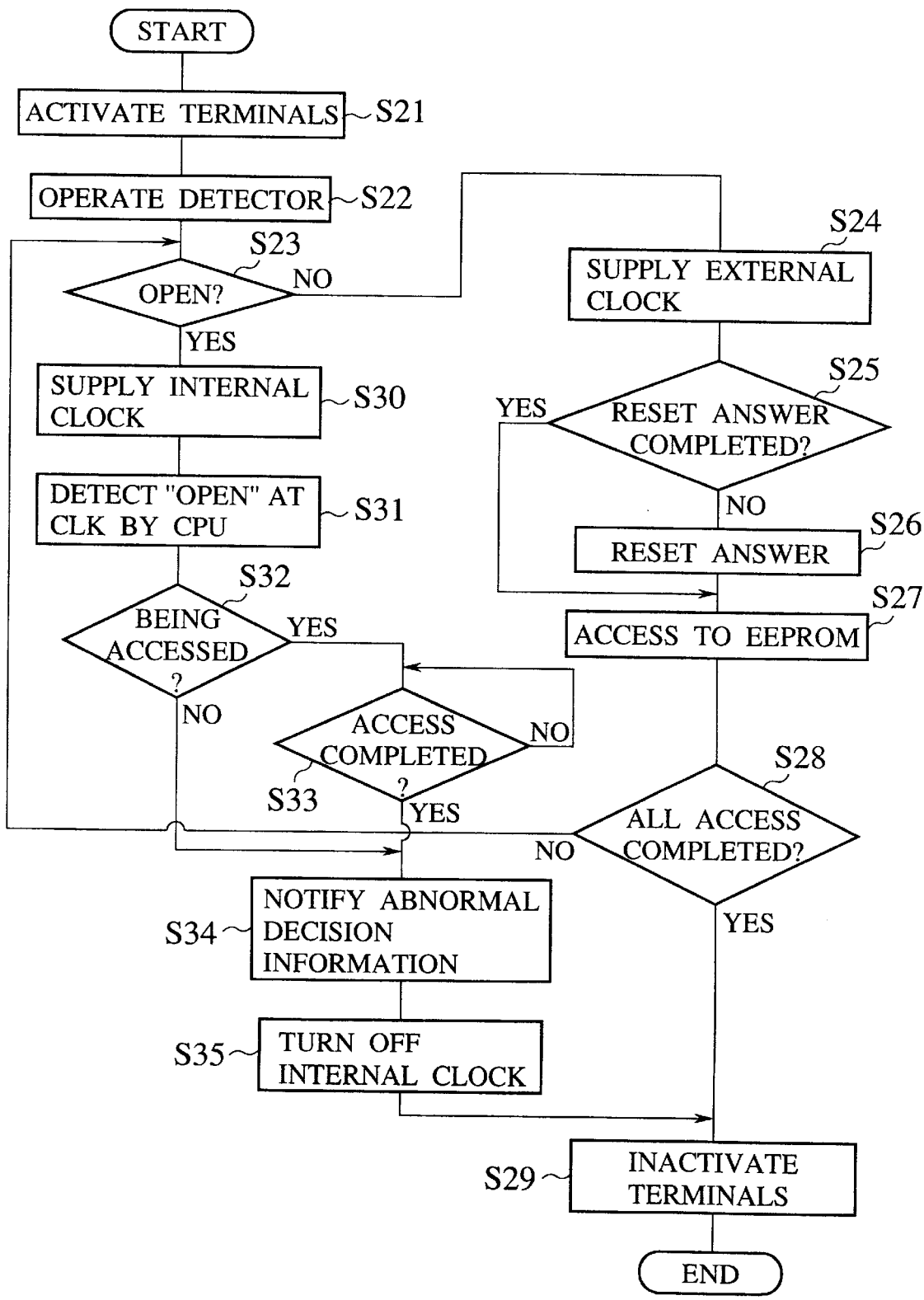
FIG. 8 is a flowchart showing the operation of an IC card of the system of the second embodiment.
Figure 9:
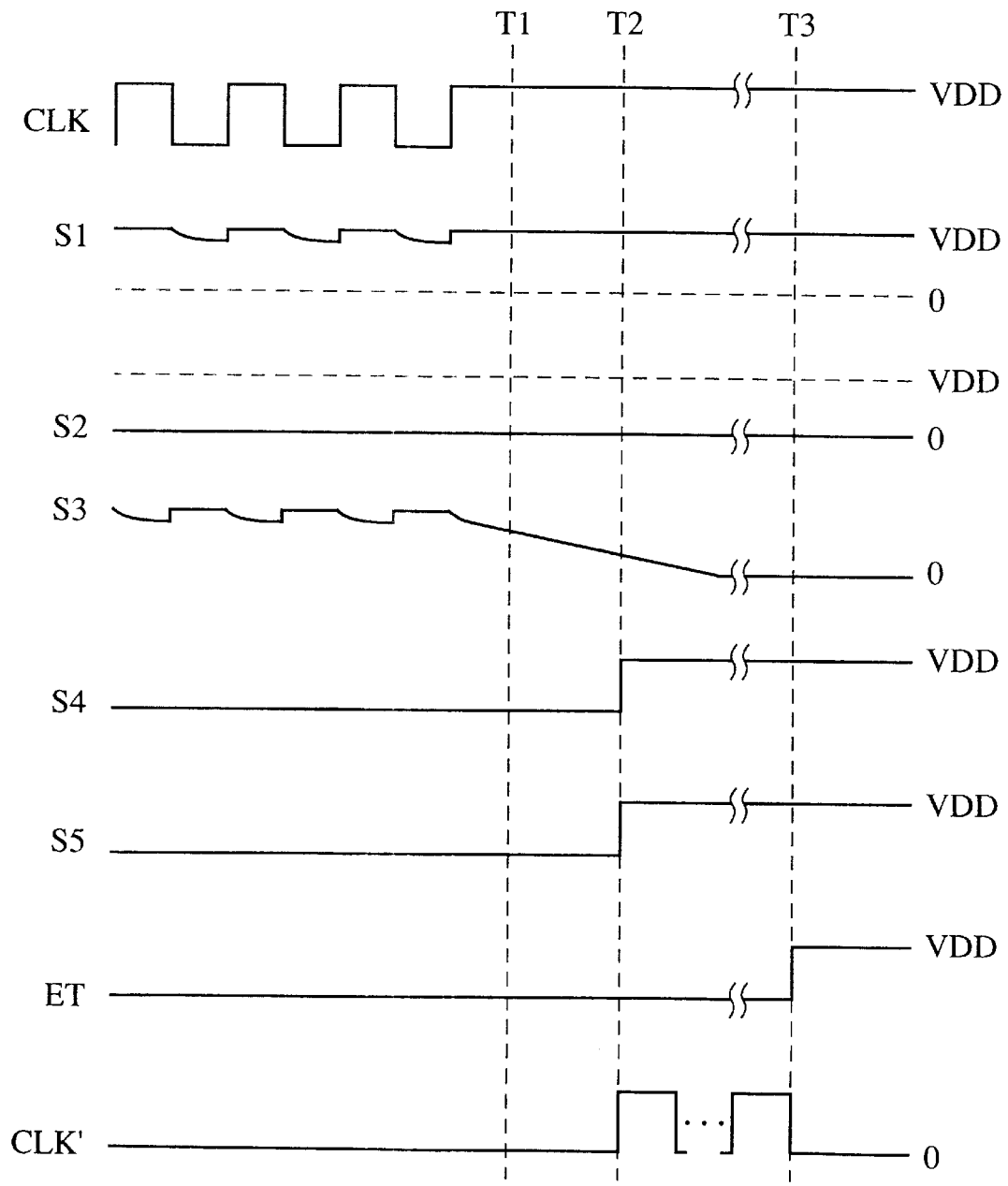
FIG. 9 is a timing chart showing an operation of detecting the contact condition of a clock terminal of the system of the second embodiment.

The operation of the second embodiment will be explained with reference to FIGS. 8 and 9, in which FIG. 8 is a flowchart showing the operation of the IC card 50 and FIG. 9 is a timing chart showing an operation of detecting the contact condition of the clock terminal 13. In step S21, the IC card 50 is inserted into the reader-writer 30, and the reader-writer 30 activates the terminals 11 to 15 of the IC card 50. In step S22, the detector 60 receives the supply voltage VDD and starts to detect the contact condition of the clock terminal 13. In step S23, the testing function of the CPU 56 determines whether or not the detected contact condition is good. If it is good, signals in the detector 60 have waveforms shown before T1 in FIG. 9, and the selector 68 selects, in step S24, the external clock signal CLK of several megahertz supplied through the clock terminal 13. More precisely, if the contact condition of the clock terminal 13 is good and sound, the output S1 of the low-pass filter 62 rises to VDD in response to a rise of the clock signal CLK and discharges while the clock signal CLK is being low. As a result, the terminal S2 of the CPU 56 is kept at low. On the other hand, the output S3 of the low-pass filter 65 rises to VDD in response to a fall of the clock signal CLK and discharges while the clock signal CLK is being high. As a result, the terminal S4 of the CPU 56 is kept at low. The self-oscillator 67 receives a high-level signal to the terminal SP and the start signal S5 of low level to the terminal ST, and therefore, is inactive. Since the start signal S5 is low, the selector 68 selects the external clock signal CLK and supplies it to the clock terminal CK of the CPU 56. Step S25 checks to see if a reset answer has been made to the reader-writer 30. At first, step S25 provides NO, and step S26 provides the reader-writer 30 with a reset answer. Step S27 accesses the EEPROM 17. Step S28 checks to see if the access is complete. If the access is complete, step S29 inactivates the terminals 11 to 15 of the IC card 10. If the access is incomplete, step S23 is repeated.

If the contact condition of the clock terminal 13 is poor or faulty in step S23, step S30 is carried out. If the clock terminal 13 is faulty at high level at T1 of FIG. 9, the output S1 of the low-pass filter 62 is kept at VDD. On the other hand, the output S3 of the low-pass filter 65 continuously discharges to 0 V. At T2, the output S3 drops below the threshold voltage of the inverter 66b. Then, the output of the inverter 66b becomes high, which is supplied to the terminal S4 of the CPU 56. At the same time, the start signal S5 is activated and supplied to the terminal ST of the self-oscillator 67. At this time, the terminal SP thereof receives a low-level signal from the NOR gate 66c. As a result, the self-oscillator 67 generates the internal clock signal CLK'. In response to the activated start signal S5, the selector 68 selects the internal clock signal CLK' and supplies it to the clock terminal CK of the CPU 56 in step S30. Since the terminal S2 is low and the terminal S4 is high, the CPU 56 determines that the contact condition of the clock terminal 13 is faulty in step S31. Step S32 checks to see if a given area or a record (FIG. 7) of the EEPROM 17 is being accessed for writing or reading. If it is accessed, step S33 continues the access until it is completed.

For example, each record in a given area of the EEPROM 17 stores a personal address. If the contact condition of the clock terminal 13 becomes faulty while a personal address is being written into a record, the address will be stored erroneously. There is a risk of reading this erroneous address out of the EEPROM 17 and using it. To avoid the risk, step S33 of the second embodiment repeats to complete an access operation such as a read or write operation that is being carried out on the EEPROM 17 when faulty contact is detected on the clock terminal 13.

If step S33 confirms that the access operation is complete, step S34 provides the reader-writer 30 with abnormality information about the faulty contact at the clock terminal 13. Then, the reader-writer 30 quickly takes proper steps to cope with the contact fault. If no access operation is being carried out when the contact fault of the clock terminal 13 is detected in step S32, step S34 is directly carried out. This kind of contact fault usually occurs when the IC card 50 is inserted into the reader-writer 30.

After informing the reader-writer 30 of the abnormality, the CPU 56 raises the terminal ET to high at T3, thereby stopping the self-oscillator 67 and disabling the internal clock signal CLK' in step S35. This minimizes the operation of the self-oscillator 67 and the power consumption of the IC card 50.

(Third embodiment)

Figure 10:
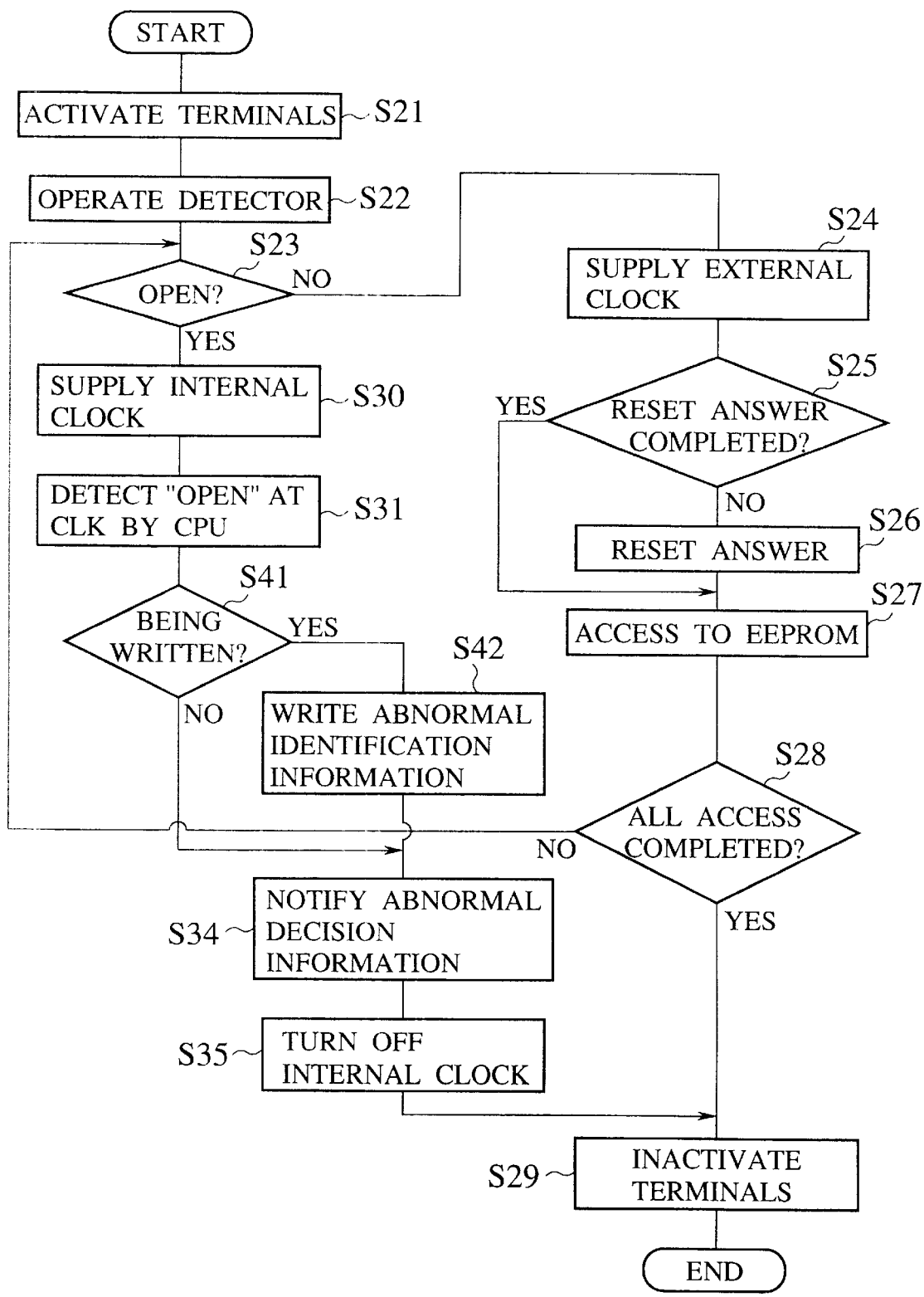
FIG. 10 is a flowchart showing the operation of a contact-type IC card system according to a third embodiment of the present invention.

FIG. 10 is a flowchart showing the operation of a contact-type IC card system according to the third embodiment of the present invention. The hardware of the third embodiment is the same as that of the second embodiment of FIG. 6. Namely, the system employs the TC card having the single semiconductor IC chip containing the CPU 56, EEPROM 17, detector 60, and self-oscillator 67. The third embodiment is characterized in that, if the contact condition of the clock terminal 13 is determined to be poor and faulty while data is being written into a given area of the EEPROM 17, an abnormality identifier is written into the area in question, so that it is easily recognized that the data in the area is erroneous when it is read out of the EEPROM 17.

Figure 11:
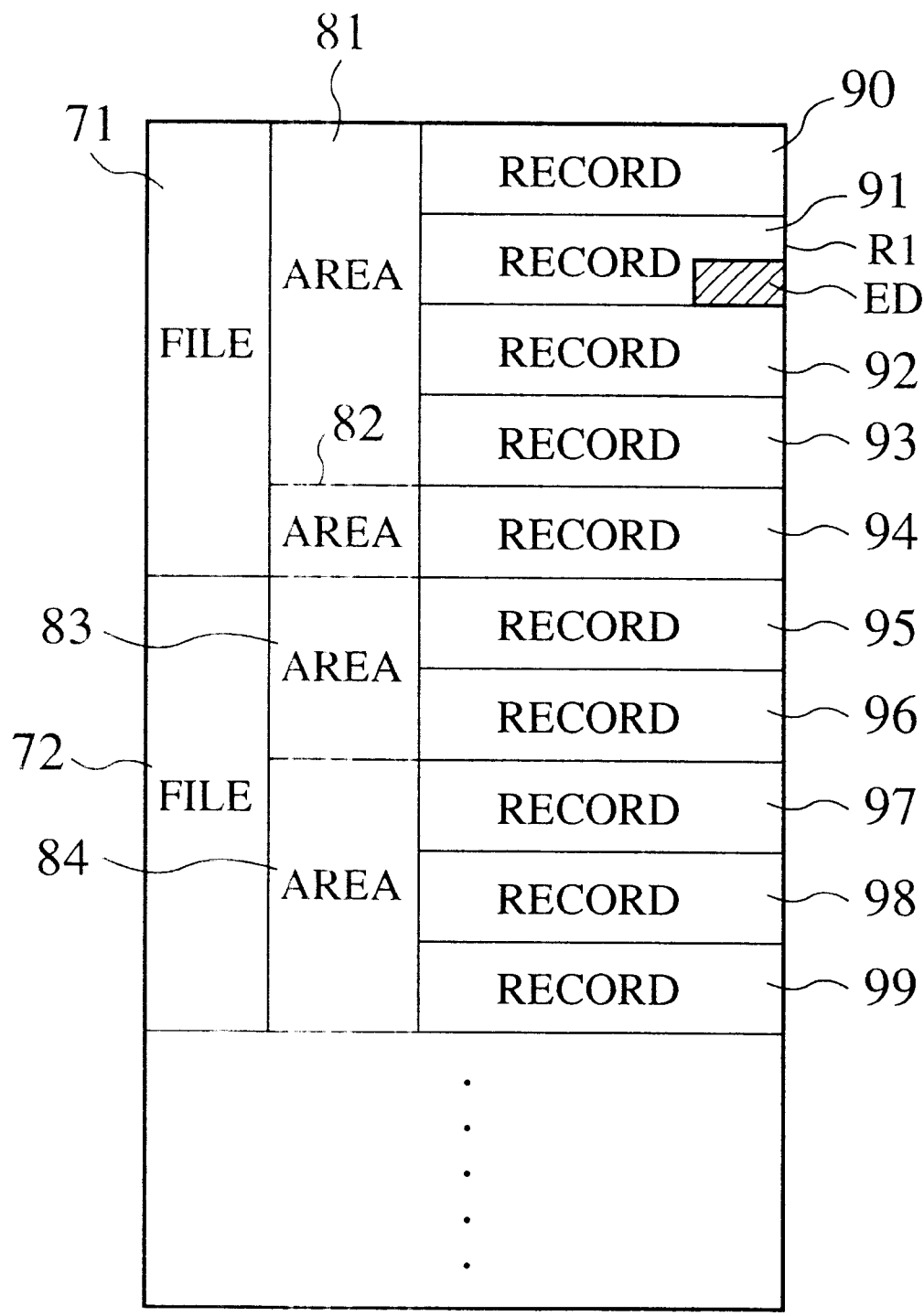
FIG. 11 shows an abnormality identifier written in a memory according to the third embodiment.

After step S31 in FIG. 10, step S41 checks to see if data is being written into the EEPROM 17. If so, step S42 writes an abnormality identifier ED into a part of, for example, a record R1 as shown in FIG. 11. Thereafter, step S34 informs the reader-writer 30 of the abnormality, i.e., the faulty contact. If step S41 determines that no data is being written into the EEPROM 17, step S34 is directly carried out to inform the reader-writer 30 of the faulty contact. The other steps of FIG. 10 are the same as those of the second embodiment of FIG. 8.

Various modifications will become possible for those skilled in the art after receiving the teachings of the present disclosure without departing from the scope thereof.

What is claimed is:

1. An integrated circuit for an IC card having a first reset terminal configured such that it can be connected with a second reset terminal of an external unit, the integrated circuit comprising:
   (a) a memory;
   (b) a detector configured such that it can be connected to the first reset terminal, and configured such that it can detect a variation of a potential at the first reset terminal for testing an abnormal contact between the first and second reset terminals; and
   (c) a central processing unit (CPU) connected between the detector and the memory, providing input signals to the detector for generating the variation of the potential, and notifying of the abnormal contact to the external unit, employing an output signal from the detector.

2. An integrated circuit for an IC card having a first reset terminal configured such that it can be connected with a second reset terminal of an external unit, the external unit having a pull-up resistor connected between a first high-level power supply and the second reset terminal, the integrated circuit comprising:
   (a) a central processing unit (CPU);
   (b) a detector connected to the CPU and configured such that it can be connected to the first reset terminal, the detector providing a faulty contact indicating signal to the CPU when a contact between the first and second reset terminals is faulty; and
   (c) a memory connected to the CPU.

3. The circuit of claim 2, wherein the detector comprises:
   a first transistor arranged between and connected to a second high-level power supply and the first reset terminal; and
   a second transistor arranged between and connected to the first reset terminal and a low-level power supply and having larger internal resistance than the resistance of the pull-up resistor.

4. The circuit of claim 3, wherein:
   the CPU generates signals applied to control electrodes of the first and second transistors, and a voltage at the first reset terminal is used to test whether the first reset terminal is connected to the second reset terminal.

5. The circuit of claim 3, wherein the detector further comprises:
   a buffer connected to the first reset terminal; and
   an OR gate that receives the output of the buffer.

6. The circuit of claim 2, wherein the faulty contact indicating signal includes a leading edge from a low level to a high level potential and a trailing edge from the high level to the low level potential.

7. An integrated circuit for an IC card having a first clock terminal configured such that it can be connected with a second clock terminal of an external unit, the integrated circuit comprising:

(a) a central processing unit (CPU);
(b) a detector connected to the CPU and configured such that it can be connected to the first clock terminal, comprising:
  a first input circuit configured such that it can be connected to the first clock terminal, an inverter circuit connected to the first clock terminal,
  a selector configured such that it can be connected to the first clock terminal,
  a second input circuit connected to the inverter circuit, and
  a confirmation gate circuit connected to the first and second input circuits; and
(c) a memory connected to the CPU.

8. The circuit of claim 7, further comprising:
a self-oscillator driven by a start signal provided by the confirmation gate circuit and providing the selector with an internal clock signal.

9. The circuit of claim 7, wherein:
the first input circuit consists of a first tri-state buffer and a first low-pass filter; and
the second input circuit consists of a second tri-state buffer and a second low-pass filter.

10. An IC card having a first reset terminal configured such that it can be connected with a second reset terminal of an external unit, the IC card comprising:
(a) a peripheral circuit having a memory;
(b) a central processing unit (CPU) notifying of an abnormal contact between the first and second reset terminals to the external unit, and controlling the operation of the peripheral circuit upon receiving a command from the external unit; and
(c) a detector connected between the CPU and the first reset terminal, and configured such that it can test the abnormal contact between the first and second reset terminals, upon receiving a signal supplied by the CPU.

11. An IC card having a first reset terminal configured such that it can be connected with a second reset terminal of an external unit, comprising:
(a) a central processing unit (CPU) testing whether the first reset terminal is connected to the second reset terminal, notifying to the external unit of a faulty contact if the first reset terminal is not sufficiently connected to the second reset terminal, and prohibiting the resetting of the CPU while testing and notifying;
(b) a detector connected between the CPU and the first reset terminal and configured to detect a variation of a potential at the first reset terminal upon receiving input signals supplied by the CPU; and
(c) a memory connected to the CPU.

12. The IC card of claim 11, wherein the second reset terminal is adapted for connection to a pull-up resistor being connected to a first high-level supply, and the detector comprises:
a first transistor arranged between and connected to a second high-level power supply and the first reset terminal; and
a second transistor arranged between and connected to the first reset terminal and a low-level power supply and having larger internal resistance than the resistance of the pull-up resistor.

13. The IC card of claim 12, wherein:
the input signals are applied to control electrodes of the first and second transistors, and whether the first reset terminal is connected to the second reset terminal is tested according to a voltage at the first reset terminal.

14. An IC card having a first reset terminal configured such that it can be connected with a second reset terminal of an external unit, comprising:
(a) a central processing unit (CPU) testing whether the first reset terminal is connected to the second reset terminal, notifying to the external unit of a faulty contact if the first reset terminal is not sufficiently connected to the second reset terminal, and continuing to complete an access operation, which is in progress when the first reset terminal is not sufficiently connected to the second reset terminal, and then, stopping the operation of the CPU;
(b) a detector connected between the CPU and the first reset terminal; and
(c) a memory connected to the CPU.

15. The IC card of claim 14, wherein the notifying means notifies to the external unit of the faulty contact after the completion of the access operation, and thereafter, the control means stops the operation of the CPU.

16. An IC card having a first clock terminal configured such that it can be connected with a second clock terminal of an external unit, the integrated circuit comprising:
(a) a central processing unit (CPU) testing whether the first clock terminal is connected to the second clock terminal, and continuing to complete an access operation under progress even when an abnormal contact between the first and second clock terminals is observed;
(b) a detector connected between the CPU and the first clock terminal and configured to detect a pulse waveform at a node in the detector to provide an output signal to the CPU; and
(c) a memory connected to the CPU.

17. The IC card of claim 16, wherein the detector comprises:
a first input circuit connected to the first clock terminal;
an inverter circuit connected to the first clock terminal;
a selector connected to the first clock terminal;
a second input circuit connected to the inverter circuit; and
a confirmation gate circuit connected to the first and second input circuits.

18. The IC card of claim 17, further comprising:
a self-oscillator driven by a start signal provided by the confirmation gate circuit and providing the selector with an internal clock signal.

19. The IC card of claim 17, wherein:
the first input circuit consists of a first tri-state buffer and a first low-pass filter; and
the second input circuit consists of a second tri-state buffer and a second low-pass filter.

20. The IC card of claim 17, wherein the access operation is one of write and read operations carried out with respect to the memory.

21. The IC card of claim 17, wherein the access operation is to write an abnormality identifier into a given area of the memory.

22. An IC card system comprising:
(a) an IC card having,
  a first reset terminal memory,
  a central processing unit (CPU) connected to the memory, and
  a detector connected between the CPU and the first reset terminal, and configured to detect a variation of a potential at the first reset terminal for testing an abnormal contact upon receiving a signal supplied by the CPU; and (b) an external unit comprising,
a second reset terminal to be connected with the first reset terminal, and
a pull-up resistor connected between a first high-level power supply and the second reset terminal.

23. An IC card system comprising:
(a) an IC card comprising
a first reset terminal,
a central processing unit (CPU) testing a contact condition of the first reset terminal by notifying a detector connected between the CPU and the first reset terminal to detect the contact condition, notifying of a faulty contact if the contact condition detected by the detector is faulty, and prohibiting the resetting of the CPU while testing, and
a memory connected to the CPU; and
(b) an external unit having a second reset terminal configured to be connected with the first reset terminal, said CPU configured to notify the external unit of the faulty contact between the first and second reset terminals, when the faulty contact is detected by the detector.

24. An IC card system comprising:
(a) an IC card comprising:
a first reset terminal;
a central processing unit (CPU) testing a contact condition to the first reset terminal, notifying of a faulty contact if the contact condition is faulty, and continuing to complete an access operation, which is in progress when the contact condition is faulty, and then, stopping the operation of the CPU;
a detector connected between the CPU and the first reset terminal; and
a memory connected to the CPU; and
(b) an external unit having a second reset terminal to be connected with the first reset terminal, said CPU configured to notify the external unit of the faulty contact between the first and second reset terminals.

25. The IC card system of claim 24, wherein the access operation is one of write and read operations carried out with respect to the memory.

26. The IC card system of claim 24, wherein the access operation is to write an abnormality identifier into a given area of the memory.

27. An integrated circuit for an IC card having a first clock terminal configured such that it can be connected to a second clock terminal of an external unit, the integrated circuit comprising:

(a) a memory;
(b) a central processing unit (CPU) connected to the memory;
(c) a detector connected to the CPU and configured such that it can be connected to the first clock terminal and configured such that it can detect a pulse waveform at a node in the detector for testing an abnormal contact between the first and second clock terminals; and
(d) a self oscillator connected between the CPU and the detector.

28. The circuit of claim 27, wherein the CPU notifies of the abnormal contact to the external unit and controls the operation of the memory upon receiving a command from the external unit.

29. The circuit of claim 28, wherein the CPU checks whether the memory is being accessed or not and confirms whether an access operation to the memory has been completed or not.

30. An IC card system comprising:
(a) an IC card comprising:
a first clock terminal,
a memory,
a central processing unit (CPU) connected to the memory,
a detector connected between the CPU and the first clock terminal and configured to detect a pulse waveform at a node in the detector for testing an abnormal contact upon receiving a signal supplied by the CPU, and
a self oscillator connected between the CPU and the detector; and
(b) an external unit having a second clock terminal to be connected with the first clock terminal,
wherein the abnormal contact between the first and second clock terminals is detected by the detector.

31. The IC card system of claim 30, wherein the detector comprises:
a first input circuit connected to the first clock terminal;
an inverter circuit connected to the first clock terminal;
a selector connected to the first clock terminal;
a second input circuit connected to the inverter circuit; and
a confirmation gate circuit connected to the first and second input circuits.

* * * * *